Patented Jan. 16, 1934

1,943,468

UNITED STATES PATENT OFFICE 1,943,468

WAX EMULSION COATING, AND COATING PROCESS

Walter A. Bridgeman and John Alan Schade, Owego, N. Y., assignors to The Wilbur White Chemical Company, Owego, N. Y., a corporation of New York No Drawing. Application November 22, 1932
Serial No. 643,950

14 Claims. (Cl. 99—8)

The present invention relates primarily to the art of preparing fresh fruits and vegetables for market, and is concerned more particularly with a process for the treatment of fresh fruits and vegetables and with wax emulsion coating compositions adapted therefor.

It heretofore had been proposed to provide fruit with waxy protective coatings over an application of a fungus growth-retarding agent or fungicide, whereby to retard or avoid growth of destructive fungi, partially or wholly seal the skin or outer surface of the object and enhance the attractiveness of the same by the provision of a lustrous appearance. Each of these results is desirable and to be sought for. Such prior art proposals, however, involve the practicing of a plurality of separate treatments or operations; moreover, their practice necessitates the use of considerable equipment. The employment of heat in such treatments of fruit may give a "cooked" taste to the resulting product. If organic solvents are used in the coating composition there is danger of the taste and/or odor of the solvents penetrating into the body or edible portions of the fruit.

It has now been found that the aforesaid desirable results of preserving and imparting luster to fruits may be effected by the practicing of a process involving but one positive operation, and with relatively very simple equipment, by making use of the aqueous wax emulsion coating compositions of the present invention (which compositions are hereinafter more specifically described). The process of the present invention consists essentially in providing the outer surface of the objects with a continuous protective film of the composition: this may be effected in any suitable manner, as by completely covering the surface thereof by application thereto of an excess of the composition, suitably by dipping and draining, e. g., by passing the fruit (or vegetables, or other objects to be protected) into and out of a bath of the coating composition, and thereafter simply allowing the so-treated objects to drain and dry. Thereby the objects are provided with a very thin but coherent, lustrous, protective film coating of waxy coating composition. The attribute of lustrousness is positive, it being wholly unnecessary to subject the coated objects to brushing or other polishing treatment in order to impart thereto the said attribute: the luster is inherent in the dry coating. The said emulsion need not, in general, be heated but may be applied at ordinary room temperature (about 70° F.) or even at somewhat lower temperature. The apparatus employed is simple; for instance, the equipment necessary for the carrying out of the dipping process above referred to need comprise only a vat for the emulsion and a draining and drying means for the accommodation of the treated objects. The invention then, in essence, resides in the provision of a simplified, economical, one-operation, cold coating process yielding a product coated with a lustrous waxy composition which preserves and enhances the value of the treated object, and in the provision of a coating bath of an aqueous waxy emulsion having the necessary surface tension to spread completely yet in a very thin film and to dry quickly, which film of waxy coating requires no buffing or polishing at any time—either during the formation of the film or thereafter—in order to bring up or maintain a desirable lustrousness.

The coating compositions of the present invention are characterized by being aqueous wax emulsions containing carnauba, or an equivalent hard wax, and emulsifying and/or dispersing agents. The waxy constituent of the compositions consists predominantly of carnauba wax and/or another hard wax such as candelilla wax, and may include also another wax such as ceresin wax, or paraffin, or a resinous or gummy substance such as Pontianak gum, sandarac gum, shellac, rosin or an equivalent. The emulsifying and/or dispersing agent is a soap such, for instance, as triethanolamine soap or other soap of known emulsive and/or dispersive properties. The oleate, stearate or the like of triethanolamine, is operable, as are the following: ammonium linoleate; ammonium resinate; and the sodium and/or potassium salts of such acids.

The coating composition may also be applied to the fruit or other object to be protected by spraying or showering the fluid emulsion over the same, draining excess emulsion therefrom, and drying the so-deposited film of coating.

It has been found that the luster of the dried coating is a function of the carnauba wax content of the composition and also a function of the surface tension of the emulsion used in the coating operation. The latter variable may be influenced in a number of ways: for instance, by substituting the stearate for the oleate in the emulsifying agent, or by varying the amount of the base, or the nature of the base, used in preparing said agent. It will be appreciated, then, that where luster is not a desired attribute of the protective covering the composition may be so controlled as to constitution and/or mode of use as to yield a lusterless dried coating, or a coating having a predetermined relative luster.

On the proper adjustment of the surface tension of the emulsion of the present invention depends, also, the completeness of the coating operation. In carrying out the present process the surface tension of the emulsion is so adjusted that by simply dipping the object in, or passing the same through, a bath thereof and removing and draining it there has been deposited thereon a relatively very thin, continuous, film which does not require any further spreading or rubbing operations in order that the covering may be extended over the entire exposed surface of the object, or any positive operation to remove excess coating. By appropriate adjustment of the surface tension of the composition, it may be possible to obtain a satisfactory coating on the object with no material after-draining.

It should be noted that with different fruits, vegetables or the like some adjustment of the surface tension of the waxy emulsion to be used thereon should, preferably, be made. This is for the reason that an emulsion which satisfactorily coats say citrus fruits may fail to "wet" the surface of a tomato, drawing away therefrom leaving uncoated areas. Our researches in this connection have established that our emulsion in order to be suitable for the purposes of the present invention should have a surface tension of below 70 dynes per centimeter, and that the most satisfactory emulsions have a surface tension value of from about 45 to about 33 dynes per centimeter, as determined at 20° C. on a du Nouy surface tension apparatus such as was described by P. Lecomte du Nouy in "The Journal of General Physiology", May 29, 1919, vol. 1, No. 5, pages 521 to 524, inclusive, which apparatus shows a surface tension value, at 20° C., for water distilled in glass of 69.3 dynes per centimeter. Thus we have found that for citrus fruits (oranges and grapefruit), tomatoes, and certain other fruits, it is preferable to use an emulsion having a surface tension of 34–36 dynes per centimeter, while an emulsion having a surface tension of 45 dynes per centimeter shows a tendency to draw away from the fruit leaving uncoated areas. Bananas and pineapples, on the other hand, advantageously may be coated with an emulsion having a surface tension of about 44–45 dynes, although emulsions having surface tensions above 45 dynes (e. g., 49 dynes or 51.2 dynes) have a tendency to draw away from the surface of a banana into drops on drying.

The resulting waxy protective film is water-repellent, after a reasonable period of drying and hardening (e. g., twenty-four hours, more or less), and is not affected by water deposited thereon, e. g., "sweat" accumulating thereon by reason of a decided difference between the temperatures of the fruits when freshly removed from cold storage and of the atmosphere into which they are brought.

Where carnauba wax is used as the sole waxy constituent of the protective composition, the thin film of dried emulsion is relatively hard and has a tendency after some time (e. g., twenty-four hours or more), to develop tiny fissures, invisible to the naked eye. This phenomenon is decidedly advantageous, in that it obviates any possibility of the fruit being "smothered" by the waxy film or of there being trapped in the fruit disagreeably tasting products which may have been formed in the life process of the fruit.

The emulsions may also contain, if it is desired to add the same by way of the emulsion, a suitable fungicide, decay-retarding or sterilizing agent. As this constituent there may be employed in the compositions borax, boric acid, sodium benzoate, hexylresorcinol, sulphur, p-chlor-xylenol, or other soluble or dispersible, weakly acid, neutral or slightly alkaline, sterilizing agent or a combination of such agents.

*Example I*

An operable emulsion in accordance with the present invention, and having a general application, may be prepared as follows, it being noted that the parts are by weight: 65 parts of carnauba wax and 20 parts of oleic acid are heated to 95–100° C., and, when the wax is melted, the mass is thoroughly agitated or stirred to thoroughly mix the acid into the molten wax. In another vessel 10 parts of triethanolamine and 30 parts of water are mixed and heated to 95–100° C. With both mixtures at this temperature, the triethanolamine solution is added to the wax-oleic acid solution with rapid enough stirring to thoroughly mix the mass. As the last of the water solution is added the mass will thicken slightly and have the appearance of a clear jelly. Stirring is continued for 15 to 20 minutes, keeping the temperature at about 90–95° C. Then 35 pounds of paraffin wax, broken into small lumps, are added, and the mixture stirred for one-half hour, or until the paraffin is entirely melted and mixed through the jelly. Water heated to 90–95° C. is then added slowly with constant stirring; this clear transparent jelly dissolves in the hot water and produces an emulsion which has a decidedly bluish-white opalescence. Water is added until the total weight of the emulsion is 640 parts. The emulsion is then cooled rapidly.

This emulsion is better adapted for use in coating bananas, pineapples, and certain other fruits than for coating citrus fruits: it shows at 20° C. a surface tension measurement of 45 dynes per centimeter. It dries somewhat more slowly than does the emulsion to be described in Example II below. Dilution with an equal weight of water increased the surface tension value of the emulsion only slightly (not more than about 1 dyne per centimeter).

*Example II*

Another operable composition (emulsion) peculiarly adapted for use, in diluted form, where a high luster is desired on fruits, e. g. citrus fruits, may be prepared as follows:

125 pounds of carnauba wax is melted with 22 pounds of oleic acid at a temperature of about 85–90° C. A solution is made of 1 pound of caustic soda and 10 pounds of triethanolamine in 30 pounds of water and the solution is heated to 90° C. This solution is stirred into the wax-oleic acid mixture at the same temperature, and thoroughly mixed. A jelly-like mass is formed and to this water, at 90° C., is added slowly until a total weight of 550 pounds is reached. A solution of 51 pounds of Pontianak gum in 350 pounds of water and about 6¼ to 6½ pounds of caustic potash is the amount required to just dissolve the gum and leave the solution only slightly alkaline. The weight is adjusted to 1085 pounds by addition of water, and the emulsion is then cooled. The product is a concentrated emulsion in a form favorable for shipping or storage.

The concentrated emulsion thereafter is suitably diluted with water for use as treating bath. In diluting the concentrated emulsion we find that water may be incorporated with it in the ratio of from 1 to 3 pounds per 1 pound of the concentrate. Fruits passed through a treating bath of this emulsion carry therefrom substantially no excess emulsion over and above a thin coating film thereof, and surface-dry so rapidly that they may be handled in the ordinary equipment (driers, conveyors, and the like) of a fruit packing plant without any material slowing down of the ordinary operations therein. The aforesaid emulsion had a surface tension value, at 20° C., of about 35 dynes per centimeter as determined on a de Nuoy surface tension apparatus whose reading, at 20° C., for water distilled in glass was 69.3 dynes per centimeter. Dilution with an equal weight of water, to form a desirable coating bath, raised the surface tension value of the emulsion less than one dyne per centimeter.

As will be appreciated, the above specific details in no wise limit the invention but are merely illustrative thereof: the proportions of the ingredients may be varied, likewise the temperatures and the order of the operations, the only criteria being: that the wax content of the composition shall be carnauba wax or predominantly carnauba wax; that the wax, or wax and gummy or resinous substance, shall be thoroughly emulsified or dissolved, and that the surface tension of the finished emulsion shall be so adjusted, in the manner described hereinbefore, as to provide for complete spreading of the emulsion over the object to be treated and for the relative luster desired in the resulting dried coating. The specific relative proportions between emulsifying agent and other ingredients of the emulsion have been found to promote the proper surface tension of the resulting bath: a lesser content of this agent should not be used, whereas a greater content may be used in a case where a hard coating is not so necessary or desirable. Fruit-coating aqueous wax emulsion baths in accordance with the present invention may have the following compositions:

| | Percent |
|---|---|
| Carnauba wax | 5–15 |
| Emulsifying agent | 1– 4 |
| Resinous material | 2– 6 |
| Water | 92–75 |

Paraffin, if present at all, should not amount to more than one-third of the total wax content by weight. It is a diluent only, and is objectionable where a permanent high luster is required.

The compositions hereinbefore described may be diluted with water in preparing the bath or treating fluid. Thus, to 1 part by weight of the (concentrated) emulsion there may be added from ½ to 3 parts by weight of water. In certain cases it has appeared desirable to employ the last-mentioned proportion in preparing the emulsion for application by spraying or showering; however, the degree of dilution appears not to be critical. Illustrating the small change in surface tension arising from desirable additions of water we note the following:

| | Values in dynes per centimeter | | |
|---|---|---|---|
| | Carnauba wax 18% | Carnauba wax 15% Pontianak 3% | Carnauba wax 15% ammonia-cut shellac 3% |
| Concentrated | 37.8 | 35.6 | 34.2 |
| Diluted 2 parts with 1 water | 37.8 | 36 | 34.2 |
| Diluted 1 part with 1 water | 37.8 | 36.4 | 33.9 |
| Diluted 1 part with 2 water | 37.8 | 37 | 33.8 |
| Diluted 1 part with 3 water | 38.3 | 37.4 | 33.8 |

The specific emulsion above set forth may contain, dispersed or dissolved therein, a suitable amount of an appropriate sterilizing agent, e. g., borax, in an amount equivalent to 5–20% of the wax content of the composition (that is, from .5% to 5.0% of the emulsion). Or, one may in known manner substitute a relatively small amount of boric acid for a corresponding amount of the borax employed, e. g., use as the sterilizing agent component of the emulsion borax and boric acid in the proportions of 4.3% borax and 0.7% boric acid, by weight, based on the weight of the emulsion as used.

One can, and it may in certain cases be desirable to, effect the sterilization treatment prior to the operation of coating the fruit, or the like, with the aqueous waxy emulsion hereinbefore described. The present invention is not, primarily, concerned with the question as to the time of applying a sterilizing agent.

The coating compositions, and the process, of the present invention are adapted to the treatment of fruits, such as citrus fruits, apples, pears, bananas, pineapples, melons, and the like, of nuts such as cocoanuts, and of such vegetable products as peppers, cucumbers, yams, peas and beans in the pod, and even asparagus. It has been found that the provision of such a coating materially lessens evaporations of moisture from the natural food product and as well tends to prevent access of air thereto, with the result that the said product tends to retain a fresh appearance for a longer period than it otherwise would. The provision of the lustrous coating adds to the attractiveness and sales value of the food product.

It is to be noted that this coating process, and the use of the coating composition herein described, may be caused to provide positive control of the amount of the sterilizing agent (e. g., borax, boric acid, or the like) permanently associated with the food product so coated: when sterilizing agent is incorporated in the emulsion the predetermined amount of sterilizing agent added thereto is retained by the coating and persists in association with the food product. In using borax and/or boric acid as the sterilizing agent dispersed in the emulsion, the coated product shows no whitening or visible evidence of crystallization of the agent.

The coating composition has been found to be adapted for use in other fields than the treatment of fruits and vegetables. For instance, it has been found that the emulsified composition may be used as a shop-coating and rust preventive over articles which ordinarily would be subject to corrosion or rusting when in contact with the atmosphere. The emulsions are most inexpensive to use, inasmuch as water is the carrier and in view of the further fact that the process is adapted to deposit an extremely small amount of the protective solids. In this use, also, the surface tension of the emulsion should be so adjusted as to afford the predetermined result.

The expression "natural food product" as employed in the appended claims is meant to define fruits, vegetables and the like in their natural fresh state as harvested or gathered.

This is a continuation-in-part of our application Serial No. 593,927, filed February 18, 1932, containing subject matter common thereto.

We claim:

1. An aqueous emulsion comprising a waxy component including carnauba wax and an emulsifying component, said emulsion having a surface tension at 20° C. of from about 45 dynes to about 33 dynes per centimeter.

2. An aqueous emulsion as defined in claim 1, characterized therein that it contains also a resinous component.

3. An aqueous emulsion as defined in claim 1, characterized therein that it contains also a component being a member of the group consisting of Pontianak gum, sandarac gum, shellac and rosin.

4. An aqueous emulsion as defined in claim 1, characterized therein that it contains also a component being a member of the group consisting of Pontianak gum, sandarac gum, shellac and rosin, and in that the constituents are present in about the following proportions:

| | Percent |
|---|---|
| Waxy component | 5–15 |
| Emulsifying component | 1–4 |
| Resinous component | 2–6 | the remainder being water.

5. A coating composition for providing a lustrous protective coating on a natural food product, comprising a waxy component including carnauba wax, water, and an emulsifying component therefor, said composition having a surface tension at 20° C. of from about 45 dynes to about 33 dynes per centimeter.

6. A coating composition as defined in claim 5, characterized therein that it contains also a resinous component.

7. A coating composition as defined in claim 5, characterized therein that it contains also a component being a member of the group consisting of Pontianak gum, sandarac gum, shellac and rosin.

8. A coating composition as defined in claim 5, characterized therein that it contains also a component being a member of the group consisting of Pontianak gum, sandarac gum, shellac and rosin, and in that the constituents are present in about the following proportions:

| | Percent |
|---|---|
| Waxy component | 5–15 |
| Emulsifying component | 1–4 |
| Resinous component | 2–6 | the remainder being water.

9. A coating composition for protecting fresh fruits and vegetables, being a waxy emulsion having a surface tension at 20° C. of about 34–36 dynes per centimeter, said composition consisting essentially of the following ingredients in about the relative amounts stated, the parts being by weight:

| | Parts |
|---|---|
| Carnauba wax | 115 |
| Oleic acid salts of sodium hydroxide and triethanolamine | 36 |
| Pontianak gum | 47 |
| Water | 802 |

10. The coating composition defined in claim 5, characterized therein that it contains also a dispersible sterilizing component in an amount by weight equal to about one-twentieth that of the waxy component.

11. Process of providing a natural food product with a lustrous protective waxy coating, which consists in passing the natural food product into and out of a bath of an emulsified composition consisting essentially of a waxy component including carnauba wax 5 to 15%, emulsifying agent 1 to 4%, resinous material 2 to 6% and water the remainder, said bath showing at 20° C. a surface tension of from about 45 dynes to about 33 dynes per centimeter, and thereafter draining and drying the so-treated product.

12. Process of providing a natural food product with a lustrous protective waxy coating, which consists in passing the natural food product into and out of a bath of aqueous carnauba wax emulsion which shows, at 20° C., a surface tension of from about 45 dynes to about 33 dynes per centimeter, and thereafter draining and drying the so-treated product.

13. Process of providing a natural food product with a lustrous protective waxy coating, which consists in passing the natural food product into and out of a bath of aqueous wax emulsion containing carnauba wax which shows, at 20° C., a surface tension of from about 45 dynes to about 33 dynes per centimeter, said bath being maintained at a temperature not to exceed normal room temperature, and thereafter draining and drying the so-treated product.

14. Process of providing a fresh fruit with a lustrous protective waxy coating, which consists in passing the fruit into and out of a bath of aqueous emulsion consisting essentially of the following ingredients in about the relative amounts stated, the parts being by weight

| | Parts |
|---|---|
| Carnauba wax | 115 |
| Oleic acid salts of sodium hydroxide and triethanolamine | 36 |
| Pontianak gum | 47 |
| Water | 802 | said bath showing, at 20° C., a surface tension of from about 34 to about 36 degrees per centimeter and being maintained at a temperature not materially in excess of normal room temperature, and thereafter draining and drying the so-treated fruit.

WALTER A. BRIDGEMAN.
JOHN ALAN SCHADE.

DISCLAIMER 1,943,468.—*Walter A. Bridgeman* and *John Alan Schade*, Owego, N. Y. WAX EMULSION COATING, AND COATING PROCESS. Patent dated January 16, 1934. Disclaimer filed October 2, 1943, by the assignee, *Franklin Research Co.*

Hereby enters this disclaimer to claims 1, 2, 3, 4, 5, 6, 7, 8, 10, 11, 12 and 13 of said patent.

[*Official Gazette October 26, 1943.*]

the protective solids. In this use, also, the surface tension of the emulsion should be so adjusted as to afford the predetermined result.

The expression "natural food product" as employed in the appended claims is meant to define fruits, vegetables and the like in their natural fresh state as harvested or gathered.

This is a continuation-in-part of our application Serial No. 593,927, filed February 18, 1932, containing subject matter common thereto.

We claim:

1. An aqueous emulsion comprising a waxy component including carnauba wax and an emulsifying component, said emulsion having a surface tension at 20° C. of from about 45 dynes to about 33 dynes per centimeter.

2. An aqueous emulsion as defined in claim 1, characterized therein that it contains also a resinous component.

3. An aqueous emulsion as defined in claim 1, characterized therein that it contains also a component being a member of the group consisting of Pontianak gum, sandarac gum, shellac and rosin.

4. An aqueous emulsion as defined in claim 1, characterized therein that it contains also a component being a member of the group consisting of Pontianak gum, sandarac gum, shellac and rosin, and in that the constituents are present in about the following proportions:

| | Percent |
|---|---|
| Waxy component | 5–15 |
| Emulsifying component | 1–4 |
| Resinous component | 2–6 | the remainder being water.

5. A coating composition for providing a lustrous protective coating on a natural food product, comprising a waxy component including carnauba wax, water, and an emulsifying component therefor, said composition having a surface tension at 20° C. of from about 45 dynes to about 33 dynes per centimeter.

6. A coating composition as defined in claim 5, characterized therein that it contains also a resinous component.

7. A coating composition as defined in claim 5, characterized therein that it contains also a component being a member of the group consisting of Pontianak gum, sandarac gum, shellac and rosin.

8. A coating composition as defined in claim 5, characterized therein that it contains also a component being a member of the group consisting of Pontianak gum, sandarac gum, shellac and rosin, and in that the constituents are present in about the following proportions:

| | Percent |
|---|---|
| Waxy component | 5–15 |
| Emulsifying component | 1–4 |
| Resinous component | 2–6 | the remainder being water.

9. A coating composition for protecting fresh fruits and vegetables, being a waxy emulsion having a surface tension at 20° C. of about 34–36 dynes per centimeter, said composition consisting essentially of the following ingredients in about the relative amounts stated, the parts being by weight:

| | Parts |
|---|---|
| Carnauba wax | 115 |
| Oleic acid salts of sodium hydroxide and triethanolamine | 36 |
| Pontianak gum | 47 |
| Water | 802 |

10. The coating composition defined in claim 5, characterized therein that it contains also a dispersible sterilizing component in an amount by weight equal to about one-twentieth that of the waxy component.

11. Process of providing a natural food product with a lustrous protective waxy coating, which consists in passing the natural food product into and out of a bath of an emulsified composition consisting essentially of a waxy component including carnauba wax 5 to 15%, emulsifying agent 1 to 4%, resinous material 2 to 6% and water the remainder, said bath showing at 20° C. a surface tension of from about 45 dynes to about 33 dynes per centimeter, and thereafter draining and drying the so-treated product.

12. Process of providing a natural food product with a lustrous protective waxy coating, which consists in passing the natural food product into and out of a bath of aqueous carnauba wax emulsion which shows, at 20° C., a surface tension of from about 45 dynes to about 33 dynes per centimeter, and thereafter draining and drying the so-treated product.

13. Process of providing a natural food product with a lustrous protective waxy coating, which consists in passing the natural food product into and out of a bath of aqueous wax emulsion containing carnauba wax which shows, at 20° C., a surface tension of from about 45 dynes to about 33 dynes per centimeter, said bath being maintained at a temperature not to exceed normal room temperature, and thereafter draining and drying the so-treated product.

14. Process of providing a fresh fruit with a lustrous protective waxy coating, which consists in passing the fruit into and out of a bath of aqueous emulsion consisting essentially of the following ingredients in about the relative amounts stated, the parts being by weight

| | Parts |
|---|---|
| Carnauba wax | 115 |
| Oleic acid salts of sodium hydroxide and triethanolamine | 36 |
| Pontianak gum | 47 |
| Water | 802 | said bath showing, at 20° C., a surface tension of from about 34 to about 36 degrees per centimeter and being maintained at a temperature not materially in excess of normal room temperature, and thereafter draining and drying the so-treated fruit.

WALTER A. BRIDGEMAN.
JOHN ALAN SCHADE.

DISCLAIMER 1,943,468.—*Walter A. Bridgeman* and *John Alan Schade*, Owego, N. Y. WAX EMULSION COATING, AND COATING PROCESS. Patent dated January 16, 1934. Disclaimer filed October 2, 1943, by the assignee, *Franklin Research Co.*

Hereby enters this disclaimer to claims 1, 2, 3, 4, 5, 6, 7, 8, 10, 11, 12 and 13 of said patent.

[*Official Gazette October 26, 1943.*]